United States Patent
Gao et al.

(10) Patent No.: US 12,063,181 B2
(45) Date of Patent: Aug. 13, 2024

(54) METHODS, DEVICES AND COMPUTER STORAGE MEDIA FOR COMMUNICATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 430 days.

(21) Appl. No.: 17/614,149

(22) PCT Filed: May 29, 2019

(86) PCT No.: PCT/CN2019/089060
§ 371 (c)(1),
(2) Date: Nov. 24, 2021

(87) PCT Pub. No.: WO2020/237534
PCT Pub. Date: Dec. 3, 2020

(65) Prior Publication Data
US 2022/0239448 A1    Jul. 28, 2022

(51) Int. Cl.
*H04L 5/00* (2006.01)

(52) U.S. Cl.
CPC .......... *H04L 5/0094* (2013.01); *H04L 5/0048* (2013.01)

(58) Field of Classification Search
CPC ... H04L 5/0094; H04L 5/0048; H04L 1/0009; H04L 1/0041; H04L 5/0035; H04L 5/0051; H04L 1/08; H04L 5/0053; H04W 72/12
See application file for complete search history.

(56) References Cited

U.S. PATENT DOCUMENTS

| 2016/0211949 | A1* | 7/2016 | You | H04W 72/23 |
| 2019/0141693 | A1 | 5/2019 | Guo et al. | |
| 2019/0174446 | A1* | 6/2019 | Zhang | H04W 92/045 |

(Continued)

FOREIGN PATENT DOCUMENTS

WO    2019/017751 A1    1/2019

OTHER PUBLICATIONS

Huawei et al., "Enhancements on Multi-TRP/panel transmission.", 3GPP TSG RAN WG1 #97, R1-1906029., May 13-17, 2019, Reno, USA.

(Continued)

*Primary Examiner* — Hardikkumar D Patel
(74) *Attorney, Agent, or Firm* — Sughrue Mion, PLLC

(57) ABSTRACT

Embodiments of the present disclosure relate to methods, devices and computer readable media for communication. A method of communication comprises receiving, at a first device, control information from a second device; determining a transmission control indication (TCI) codepoint from the control information, the TCI codepoint indicating at least a first TCI state and a second TCI state to be used for communicating data with the second device over a physical shared channel; in response to a number of repetitions of the data being configured to be scheduled by the control information, determining a first configuration for communicating the repetitions of the data with the second device, the first configuration assigning the first and second TCI states to the repetitions of the data; and communicating, at least based on the first configuration, the repetitions of the data with the second device over the physical shared channel.

8 Claims, 7 Drawing Sheets

(56) References Cited

U.S. PATENT DOCUMENTS

2021/0218537 A1* 7/2021 Chen .................. H04L 5/0055

OTHER PUBLICATIONS

Huawei et al., "Reliability/robustness enhancement with multi-TRP/panel", 3GPP TSG RAN WG1 meeting #97, R1-1906039, May 13-17, 2019, Reno, USA.
Huawei et al., "Summary of AI: 7.2.8.2 Enhancements on Multi-TRP/Panel Transmission of Offline Discussion", 3GPP TSG RAN WG1 Meeting #97, R1-1907706, May 13-17, 2019, Reno, USA.
International Search Report of PCT/CN2019/089060 dated Mar. 6, 2020 [PCT/ISA/210].
Written Opinion of PCT/CN2019/089060 dated Mar. 6, 2020 [PCT/ISA/237].
Japanese Office Action dated Mar. 7, 2023 in Japanese Application No. 2021-570228.
NTT Docomo, Inc., "Enhancements on multi-TRP/ panel transmission", 3GPP TSG RAN WG1 #97, R1-1906224, May 13-17, 2019, Reno, USA, pp. 2-34 (33 pages total).

* cited by examiner

METHODS, DEVICES AND COMPUTER STORAGE MEDIA FOR COMMUNICATION

CROSS REFERENCE TO RELATED APPLICATIONS

This application is a National Stage of International Application No. PCT/CN2019/089060, filed May 29, 2019.

TECHNICAL FIELD

Embodiments of the present disclosure generally relate to the field of telecommunication, and in particular, to methods, devices and computer storage media for communication.

BACKGROUND

In New Radio access (NR), a network device (for example, a next generation NodeB (gNB)) may be equipped with multiple Transmission and Reception Points (TRPs) or antenna panels. That is, the network device can communicate with a terminal device (for example, a user equipment (UE)) via one or more of the multiple TRPs or antenna panels, which is also referred to as "multi-TRP communication".

In some Multi-TRP communication schemes, single downlink control information (DCI) can be used to schedule a number of Physical Downlink Shared Channel (PDSCH) or Physical Uplink Shared Channel (PUSCH) repetitions to achieve better performance. Different versions of redundancy can be included in the number of repetitions. The DCI may include a field indicating a sequence of redundancy versions (also referred to as a "RV sequence" or "sequence of RVs" in the following) to be applied to the number of repetitions. Moreover, the DCI may also include a transmission configuration indication (TCI) filed, which may indicate at least two TCI states. A TCI state may indicate one Reference Signal (RS) set as well as parameters that configure quasi co-location (QCL) relationship between RSs within the RS set and Demodulation Reference Signal (DMRS) ports for a PDSCH or a PUSCH. In this event, how to assign the TCI states and/or a RV sequence to the number of repetitions needs to be specified.

SUMMARY

In general, example embodiments of the present disclosure provide methods, devices and computer storage media for communication.

In a first aspect, there is provided a method of communication. The method comprises: receiving, at a first device, control information from a second device; determining a transmission control indication (TCI) codepoint from the control information, the TCI codepoint indicating at least a first TCI state and a second TCI state to be used for communicating data with the second device over a physical shared channel; in response to a number of repetitions of the data being configured to be scheduled by the control information, determining a first configuration for communicating the repetitions of the data with the second device, the first configuration assigning the first and second TCI states to the repetitions of the data; and communicating, at least based on the first configuration, the repetitions of the data with the second device over the physical shared channel.

In a second aspect, there is provided a method of communication. The method comprises: transmitting, from a second device, control information to a first device, the control information comprising a transmission control indication (TCI) codepoint and the TCI codepoint indicating at least a first TCI state and a second TCI state to be used for communicating data with the first device over a physical shared channel; in response to a number of repetitions of the data being configured to be scheduled by the control information, determining a first configuration for communicating the repetitions of the data with the first device, the first configuration assigning the first and second TCI states to the repetitions of the data; and communicating, at least based on the first configuration, the repetitions of the data with the first device over the physical shared channel.

In a third aspect, there is provided a device of communication. The device comprises a processor and a memory. The memory is coupled to the processor and stores instructions thereon. The instructions, when executed by the processor, cause the device to perform actions comprising: receiving, at a first device, control information from a second device; determining a transmission control indication (TCI) codepoint from the control information, the TCI codepoint indicating at least a first TCI state and a second TCI state to be used for communicating data with the second device over a physical shared channel; in response to a number of repetitions of the data being configured to be scheduled by the control information, determining a first configuration for communicating the repetitions of the data with the second device, the first configuration assigning the first and second TCI states to the repetitions of the data; and communicating, at least based on the first configuration, the repetitions of the data with the second device over the physical shared channel.

In a fourth aspect, there is provided a device of communication. The device comprises a processor and a memory. The memory is coupled to the processor and stores instructions thereon. The instructions, when executed by the processor, cause the device to perform actions comprising: transmitting, from a second device, control information to a first device, the control information comprising a transmission control indication (TCI) codepoint and the TCI codepoint indicating at least a first TCI state and a second TCI state to be used for communicating data with the first device over a physical shared channel; in response to a number of repetitions of the data being configured to be scheduled by the control information, determining a first configuration for communicating the repetitions of the data with the first device, the first configuration assigning the first and second TCI states to the repetitions of the data; and communicating, at least based on the first configuration, the repetitions of the data with the first device over the physical shared channel.

In a fifth aspect, there is provided a computer readable medium having instructions stored thereon. The instructions, when executed on at least one processor, cause the at least one processor to perform the method according to the first aspect of the present disclosure.

In a sixth aspect, there is provided a computer readable medium having instructions stored thereon. The instructions, when executed on at least one processor, cause the at least one processor to perform the method according to the second aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Figure 1:
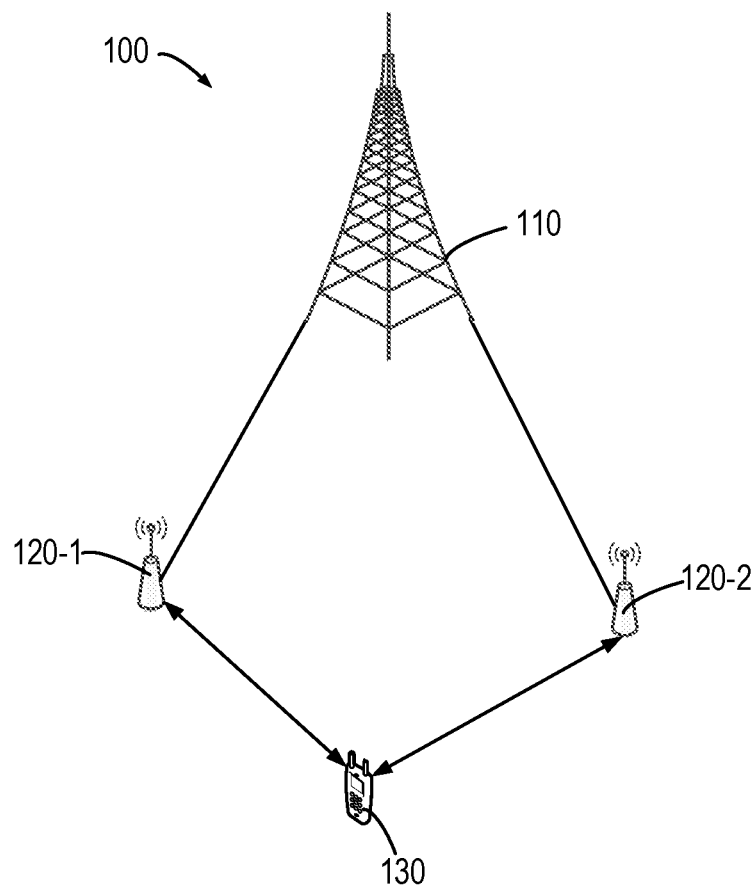
FIG. 1 illustrates an example communication network in which some embodiments of the present disclosure can be implemented.

FIG. 1 illustrates an example communication network 100 in which embodiments of the present disclosure can be implemented. As shown in FIG. 1, the network 100 includes a network device 110, which is coupled with two TRPs/panels 120-1 and 120-2 (collectively referred to as TRPs 120 or individually referred to as TRP 120). The network 100 also includes a terminal device 130 served by the network device 110. It is to be understood that the number of network devices, terminal devices and TRPs as shown in FIG. 1 is only for the purpose of illustration without suggesting any limitations. The network 200 may include any suitable number of devices adapted for implementing embodiments of the present disclosure.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as an example of the terminal device 130.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Remote Radio Unit (RRU), a radio head (RH), a remote radio head (RRH), a low power node such as a femto node, a pico node, and the like.

As used herein, the term "TRP" refers to an antenna array (with one or more antenna elements) available to the network device located at a specific geographical location. For example, a network device may be coupled with multiple TRPs in different geographical locations to achieve better coverage. It is to be understood that the TRP can also be referred to as a "panel", which also refers to an antenna array (with one or more antenna elements) or a group of antennas.

As shown in FIG. 1, the network device 110 may communicate with the terminal device 130 via the TRPs 120-1 and 120-2. In the following text, the TRP 120-1 may be also referred to as the first TRP, while the TRP 120-2 may be also referred to as the second TRP. Each of the TRPs 120 may provide a plurality of beams for communication with the terminal device 130.

The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

As described above, in some Multi-TRP communication schemes, single DCI can be used to schedule a number of PDSCH or PUSCH repetitions to achieve better performance. Different versions of redundancy can be included in the number of repetitions. The DCI may include a field indicating a sequence of RVs to be applied to the number of repetitions. Moreover, the DCI may also include a TCI filed, which may indicate at least two TCI states. A TCI state may indicate one RS set as well as parameters that configure QCL relationship between RSs within the RS set and DMRS ports for a PDSCH or a PUSCH. In this event, how to assign the TCI states and/or a RV sequence to the number of repetitions needs to be specified.

Example embodiments of the present disclosure provide a solution for multi-TRP communication. This solution can assign TCI states and/or a RV sequence to a number of PDSCH or PUSCH repetitions so as to achieve better decoding performance of the PDSCH or PUSCH.

Figure 2:
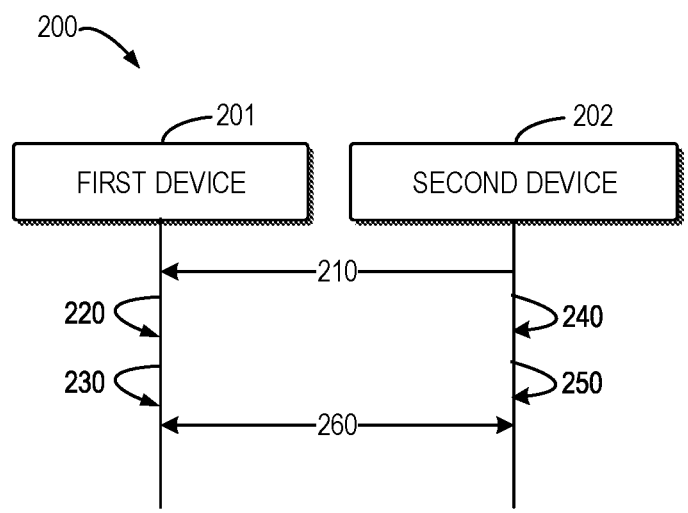
FIG. 2 illustrates an example signaling chart showing an example process in accordance with some embodiments of the present disclosure.

FIG. 2 illustrates an example signaling chart showing an example process 200 in accordance with some embodiments of the present disclosure. As shown in FIG. 2, the process 200 may involve a first device 201 and a second device 202. In some embodiments, for example, the first device 201 may be the terminal device 130 as shown in FIG. 1. In some embodiments, for example, the second device 202 may be the network device 110 or the TRP 120 as shown in FIG. 1. It is to be understood that the process 200 may include additional acts not shown and/or may omit some acts as shown, and the scope of the present disclosure is not limited in this regard.

As shown in FIG. 2, the second device 202 may transmit 210 control information (such as, DCI) to the first device 201. The control information may schedule a number of repetitions of a PDSCH or a PUSCH. The control information may include information for scheduling the PDSCH (such as, the repetitions of the PDSCH) or the PUSCH (such as, the repetitions of the PUSCH). In response to receiving the control information from the second device 202, the first device 201 may determine 220 the information for scheduling the PDSCH or the PUSCH from the control information. The first device 201 may determine 230 one or more configurations for receiving the one or more repetitions of the PDSCH from the second device or transmitting the one or more repetitions of the PUSCH to the second device based on the information. Correspondingly, the second device 202 can also determine 240 the information for scheduling the PDSCH or the PUSCH which is included in the control information. The second device 202 may likewise determine 250 one or more configurations for transmitting the one or more repetitions of the PDSCH to the first device 201 or receiving the one or more repetitions of the PUSCH from the first device 201 based on the information. It is to be understood that, the second device 202 can determine the one or more configurations in a same way as the first device 201.

As shown in FIG. 2, the second device 202 may communicate 260 the repetitions with the first device 201 based on the determined one or more configurations. For example, the second device 202 may transmit the repetitions of the PDSCH to the first device 201 based on the determined one or more configurations. Correspondingly, the first device 201 may receive the repetitions of the PDSCH from the second device 202 based on the determined one or more configurations. Alternatively, the first device 201 may transmit the repetitions of the PUSCH to the second device 202 based on the determined one or more configurations. Correspondingly, the second device 202 may receive the repetitions of the PUSCH from the first device 201 based on the determined one or more configurations.

In the following, some embodiments of the present disclosure will be described with reference to PDSCH. It is to be understood that this is merely for the purpose of illustration, without suggesting any limitation to the scope of the present disclosure. Embodiments of the present disclosure can also be applicable to PUSCH.

In some embodiments, the control information transmitted from the second device 202 to the first device 201 may include a TCI field. For example, the TCI field may include 3 bits, and a value of the TCI field may be referred to as a "TCI codepoint". In some embodiments, at least one TCI codepoint may be configured with K TCI states, where K is an integer and K>1. In some embodiments, for example, K=2. In some embodiments, prior to transmitting the control information to the first device 201, the second device 202 may firstly configure a plurality of TCI states to the first device 201, for example, via Radio Resource Control (RRC) signaling. The second device 202 may then configure, for each TCI codepoint, K TCI states that are selected from the plurality of TCI states to the first device 201, for example, via Medium Access Control (MAC) layer signaling.

In some embodiments, the first device 201 may be configured with a parameter N (where N is an integer and N≥1) about a number of PDSCH repetitions to be scheduled by the control information. For example, the second device 202 may configure the parameter N to the first device 201 via RRC signaling, MAC layer signaling or physical layer signaling. In response to being configured with the parameter N, the first device 201 can determine the number of PDSCH repetitions to be scheduled by the control information. In some embodiments, the parameter N is configured for one TCI state. That is, the total number of PDSCH repetitions to be scheduled by the control information may be N*K. For example, if N=1 and K=2, then the total number of PDSCH repetitions to be scheduled by the control information is 2. Alternatively, in some embodiments, the parameter N is configured for all of the K TCI states. That is, the total number of PDSCH repetitions to be scheduled by the control information may be N, while for each TCI state, the number of PDSCH repetitions may be N/K. For example, if N=2 and K=2, then the total number of PDSCH repetitions to be scheduled by the control information is 2 and the number of PDSCH repetitions for each TCI state is 1.

In some embodiments, the value of N should be equal to or greater than the value of K. Alternatively, in some embodiments, the parameter N is configured for all of the K TCI states. That is, the total number of PDSCH repetitions to be scheduled by the control information may be N. For example, for the first M TCI states (where M is an integer and 1≤M<N), the number of PDSCH repetitions may be ceil(N/K), while for the remaining N−M TCI states, the number of PDSCH repetitions may be (N−M*ceil(V/K))/(N−M) or floor (N/K). For example, if N=4 and K=3, then the total number of PDSCH repetitions to be scheduled by the control information is 4, the number of PDSCH repetitions for the first TCI state is 2 and the number of PDSCH repetitions for the remaining two TCI states is 1. For another example, if N=8 and K=3, then the total number of PDSCH repetitions to be scheduled by the control information is 8, the number of PDSCH repetitions for the first two TCI states is 3 and the number of PDSCH repetitions for the last TCI state is 2.

Alternatively, in some embodiments, the parameter N is configured for all of the K TCI states. That is, the total number of PDSCH repetitions to be scheduled by the control information may be N. For example, for the first M TCI states (where M is an integer and 1≤M<N), the number of PDSCH repetitions may be floor(N/K), while for the remaining N−M TCI states, the number of PDSCH repetitions may be (N−M*floor(N/K))/(N−M) or ceil(N/K). For example, if N=4 and K=3, then the total number of PDSCH repetitions to be scheduled by the control information is 4, the number of PDSCH repetitions for the first two TCI states is 1 and the number of PDSCH repetitions for the last TCI states is 1. For another example, if N=8 and K=3, then the total number of PDSCH repetitions to be scheduled by the control information is 8, the number of PDSCH repetitions for the first TCI states is 2 and the number of PDSCH repetitions for the remaining two TCI states is 3.

In some embodiments, if the control information transmitted from the second device 202 to the first device 201 indicates a TCI codepoint and the TCI codepoint is configured with K TCI states (where K is an integer and K>1), the first device 201 may determine a first TCI state (represented as "TCI A" in the following) and remaining K−1 TCI states to be used for PDSCH reception. In some embodiments, if the first device 201 is configured with the number of PDSCH repetitions, the first TCI state (that is, TCI A) may be used for a starting one of the number of PDSCH repetitions. That is, the second device 202 may transmit the starting PDSCH repetition to the first device 201 based on the first TCI state. The first device 201 may receive the starting PDSCH repetition from the second device 202 based on the first TCI state.

In some embodiments, if the control information transmitted from the second device 202 to the first device 201 indicates a TCI codepoint and the TCI codepoint is configured with K TCI states (where K is an integer and K>1), the first device 201 may determine at least a first TCI state (represented as "TCI A" in the following) and a second TCI state (represented as "TCI B" in the following) to be used for PDSCH reception. Additionally, if K>2, the first device 201 may further determine a third TCI state (represented as "TCI C" in the following) and/or a fourth TCI state (represented as "TCI D" in the following) to be used for PDSCH reception. In some embodiments, if the first device 201 is configured with the total number of PDSCH repetitions N (where N is an integer and N>=K), the first TCI state (that is, TCI A) may be used for the first to N/K times PDSCH repetitions and the second TCI state (that is TCI B) may be used for the N/K+1 to N/K*2 times PDSCH repetitions. Alternatively, or in addition, if the third TCI state is determined, the third TCI state (that is, TCI C) may be used for the N/K*2+1 to N/K*3 times PDSCH repetitions, and/or if the fourth TCI state is determined, the fourth TCI state (that is TCI D) may be used for the N/K*3+1 to N/K*4 times PDSCH repetitions.

For example, if K=2 and N=2, then the first TCI state may be used for the first PDSCH repetition, and the second TCI state may be used for the second PDSCH repetition. For another example, if K=2 and N=4, then the first TCI state may be used for the first and second PDSCH repetitions, and the second TCI state may be used for the third and fourth PDSCH repetitions. For another example, if K=2 and N=8, then the first TCI state may be used for the first to fourth PDSCH repetitions, and the second TCI state may be used for the fifth to eighth PDSCH repetitions. For another example, if K=4 and N=4, then the first TCI state may be used for the first PDSCH repetition, the second TCI state may be used for the second PDSCH repetition, the third TCI state may be used for the third PDSCH repetition, and the fourth TCI state may be used for the fourth PDSCH repetition. For another example, if K=4 and N=8, then the first TCI state may be used for the first and second PDSCH repetitions, the second TCI state may be used for the third and fourth PDSCH repetitions, and the third TCI state may be used for the fifth and sixth PDSCH repetitions, and the fourth TCI state may be used for the seventh and eighth PDSCH repetitions. For another example, if K=3 and N=4, then the first TCI state may be used for the first PDSCH repetition, the second TCI state may be used for the second PDSCH repetition, and the third TCI state may be used for the third and fourth PDSCH repetitions. For another example, if K=3 and N=4, then the first TCI state may be used for the first and second PDSCH repetitions, the second TCI state may be used for the third PDSCH repetition, and the third TCI state may be used for the fourth PDSCH repetition. For another example, if K=3 and N=8, then the first TCI state may be used for the first to third PDSCH repetitions, the second TCI state may be used for the fourth to sixth PDSCH repetitions, and the third TCI state may be used for the seventh and eighth PDSCH repetitions. For another example, if K=3 and N=8, then the first TCI state may be used for the first and second PDSCH repetitions, the second TCI state may be used for the third to fifth PDSCH repetitions, and the third TCI state may be used for the sixth to eighth PDSCH repetitions.

In some embodiments, if the control information transmitted from the second device 202 to the first device 201 indicates a TCI codepoint and the TCI codepoint is configured with K TCI states (where K=2), the first device 201 may determine a first TCI state (represented as "TCI A" in the following) and a second TCI state (represented as "TCI B" in the following) to be used for PDSCH reception. In some embodiments, if the first device 201 is configured with the number of PDSCH repetitions, the first TCI state (that is, TCI A) may be used for a starting one of the number of PDSCH repetitions. That is, the second device 202 may transmit the starting PDSCH repetition to the first device 201 based on the first TCI state. The first device 201 may receive the starting PDSCH repetition from the second device 202 based on the first TCI state.

In some embodiments, different time and/or frequency resources may be configured for the number of PDSCH repetitions. In some embodiments, in the case of Time Domain Multiplexing (TDM), different time resources (for example, different slots or sub-slots) may be configured for the number of PDSCH repetitions. The starting PDSCH repetition may be transmitted/received based on the earliest one of the time resources. Alternatively, in some embodiments, in the case of Frequency Domain Multiplexing (FDM), different frequency resources may be configured for the number of PDSCH repetitions. The starting PDSCH repetition may be transmitted/received based on the lowest or highest one of the frequency resources and/or based on a frequency resource indicated firstly in a resource allocation field of a configuration for allocating the frequency resources.

In some embodiments, in response to the control information transmitted from the second device 202 to the first device 201 indicating a TCI codepoint and the TCI codepoint is configured with K TCI states (where K=2), the first device 201 may determine a first TCI state (represented as "TCI A" in the following) and a second TCI state (represented as "TCI B" in the following) to be used for PDSCH reception. In some embodiments, in response to a number of PDSCH repetitions being configured to be scheduled by the control information, the first device 201 may determine a first configuration for receiving the number of PDSCH repetitions from the second device 202. In some embodiments, the first configuration may assign the first and second TCI states to the number of PDSCH repetitions. In some embodiments, the first configuration for assigning TCI states to different PDSCH repetitions may be determined at least based on a multiplexing scheme associated with resource allocations for the different PDSCH repetitions. A multiplexing scheme is also referred to as a "repetition scheme" in the following, including but not limited to, TDM, FDM, or FDM in combination with TDM. For example, FIGS.

3A-3C illustrates example diagrams for assigning TCI states to different PDSCH repetitions under different repetition schemes.

Figure 3A:
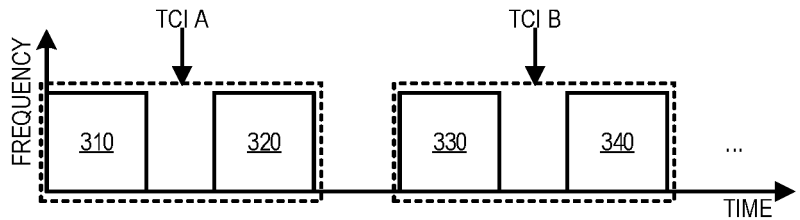
FIGS. 3A-3C illustrate example diagrams for assigning TCI states to different PDSCH repetitions in accordance with some embodiments of the present disclosure.

FIG. 3A shows an example in the case of TDM. In FIG. 3A, it is assumed that the total number of PDSCH repetitions scheduled by single DCI is 4. For example, as shown in FIG. 3A, 4 PDSCH transmission occasions 310, 320, 330 and 340 are configured to be scheduled by single DCI. In FIG. 3A, it is also assumed that K=2. For example, TCI A and TCI B are to be used for PDSCH transmission/reception. In some embodiments, as shown in FIG. 3A, the first two PDSCH repetitions 310 and 320 may be transmitted/received based on TCI A, while the remaining two PDSCH repetitions 330 and 340 may be transmitted/received based on TCI B.

Figure 3B:
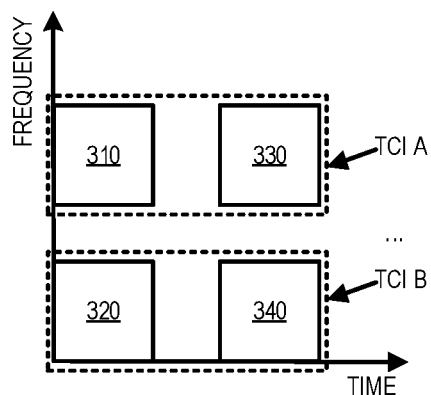

FIG. 3B shows an example in the case of FDM combined with TDM. In FIG. 3B, it is assumed that the total number of PDSCH repetitions scheduled by single DCI is 4. For example, as shown in FIG. 3B, 4 PDSCH transmission occasions 310, 320, 330 and 340 are configured to be scheduled by single DCI. In FIG. 3B, it is also assumed that K=2. For example, TCI A and TCI B are to be used for PDSCH transmission/reception. In some embodiments, as shown in FIG. 3B, the PDSCH repetitions 310 and 330 associated with one frequency resource (such as, the higher one of two frequency resources) may be transmitted/received based on TCI A, while the remaining PDSCH repetitions 320 and 340 associated with another frequency resource (such as, the lower one of the two frequency resources) may be transmitted/received based on TCI B.

Figure 3C:
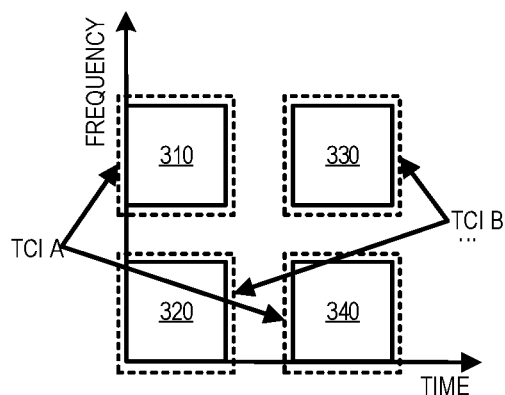

FIG. 3C shows an example in the case of FDM combined with TDM. In FIG. 3C, it is assumed that the total number of PDSCH repetitions scheduled by single DCI is 4. For example, as shown in FIG. 3C, 4 PDSCH transmission occasions 310, 320, 330 and 340 are configured to be scheduled by single DCI. In FIG. 3B, it is also assumed that K=2. For example, TCI A and TCI B are to be used for PDSCH transmission/reception. Additionally, in FIG. 3C, frequency hopping may be enabled, for example, resource allocations for different frequency ranges may be the same, and/or Modulation and Coding Schemes (MCSs) for different frequency ranges may be the same. In this case, as shown in FIG. 3C, the PDSCH repetitions 310 and 340 with different frequency ranges associated with the same resource allocation or the same MCS may be transmitted/received based on TCI A, while the remaining PDSCH repetitions 320 and 330 with different frequency ranges associated with the same resource allocation or the same MCS may be transmitted/received based on TCI B. In some embodiments, in the case of FDM combined with TDM, whether the frequency hopping is enabled or not can be configured by the second device 202 to the first device 201, for example, via RRC signaling or DCI.

In some embodiments, for different repetition schemes, the order of the PDSCH repetitions may be different. In some embodiments, by default, the starting PDSCH repetition may be transmitted/received based on the first TCI state (such as, TCI A). Alternatively, in some embodiments, the order of the PDSCH repetitions and the assignment of different TCI states to different PDSCH repetitions can be dynamically indicated by the second device 202 to the first device 201, for example, via DCI.

In some embodiments, the order of the PDSCH repetitions may depend on a slot format configuration. For example, in case that the total number of PDSCH repetitions is configured, the slot format configuration may only enable a part of the PDSCH repetitions. In some embodiments, in this case, the first configuration for assigning TCI states to different PDSCH repetitions may be determined such that the same TCI state is assigned to adjacent PDSCH repetitions that are enabled and different TCI state are evenly distributed among the enabled PDSCH repetitions.

Figure 4A:
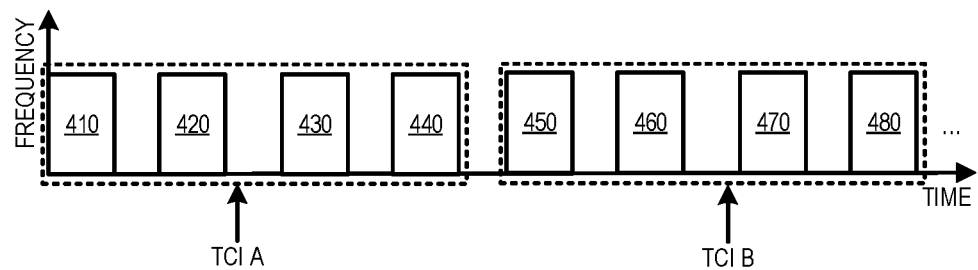
FIGS. 4A-4B illustrate example diagrams for assigning TCI states to different PDSCH repetitions in accordance with some embodiments of the present disclosure.
Figure 4B:
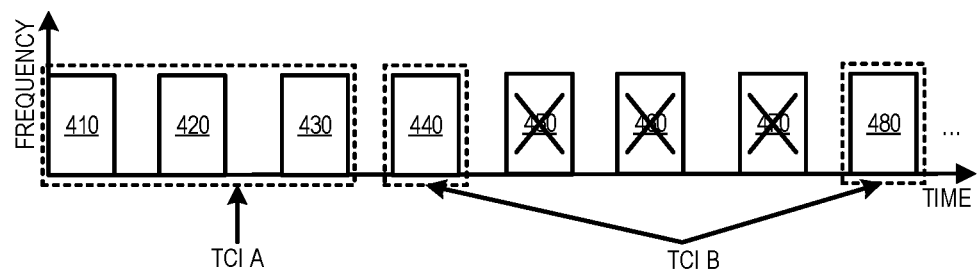

In some embodiments, assuming that TCI A and TCI B are to be used for PDSCH transmission/reception, if the total number of PDSCH repetitions is M and P PDSCH repetitions of the total M PDSCH repetitions are disabled by the slot format configuration, then TCI A will be used for ceil ((M−P)/2) times, while TCI B will be used for floor ((M−P)/2) times. FIGS. 4A and 4B show examples of such embodiments.

In some embodiments, assuming that TCI A and TCI B are to be used for PDSCH transmission/reception, if the total number of PDSCH repetitions is M and P PDSCH repetitions of the total M PDSCH repetitions are disabled by the slot format configuration, then TCI A will be used for floor ((M−P)/2) times, while TCI B will be used for ceil ((M−P)/2) times.

Figure 8:
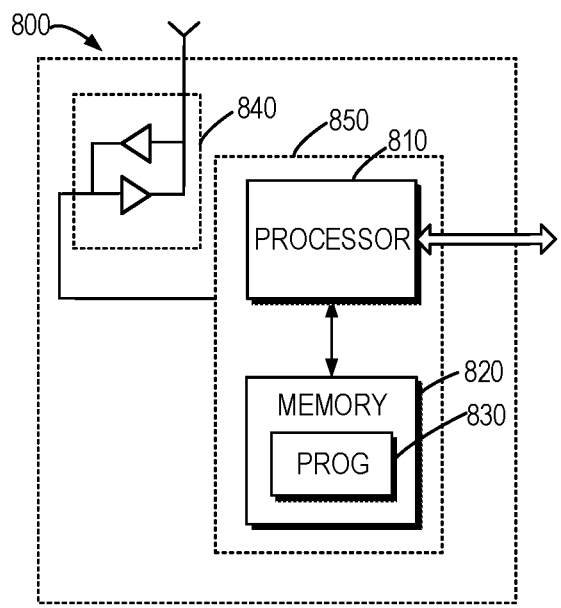
FIG. 8 is a simplified block diagram of a device that is suitable for implementing embodiments of the present disclosure.

FIG. 4A shows a normal scenario where no PDSCH repetition is disabled. In FIG. 4A, it is assumed that the total number of PDSCH repetitions scheduled by single DCI is 8. For example, as shown in FIG. 4A, 8 PDSCH transmission occasions 410, 420, 430, 440, 450, 460, 470 and 480 are configured to be scheduled by single DCI. In FIG. 4A, it is also assumed that K=2. For example, TCI A and TCI B are to be used for PDSCH transmission/reception. In some embodiments, as shown in FIG. 4A, the first four PDSCH repetitions 410-440 may be transmitted/received based on TCI A, while the remaining four PDSCH repetitions 450-480 may be transmitted/received based on TCI B. FIG. 4B shows another scenario where the PDSCH repetitions 450, 460 and 470 in FIG. 4A are disabled by the slot format configuration. In this case, as shown in FIG. 4B, the PDSCH repetitions 410-430 may be transmitted/received based on TCI A, while the PDSCH repetitions 440 and 480 may be transmitted/received based on TCI B.

In some embodiments, in response to the control information transmitted from the second device 202 to the first device 201 indicating a TCI codepoint and the TCI codepoint is configured with K TCI states (where K=2), the first device 201 may determine a first TCI state (represented as "TCI A" in the following) and a second TCI state (represented as "TCI B" in the following) to be used for PDSCH reception. In some embodiments, in response to a number of PDSCH repetitions being configured to be scheduled by the control information, the first device 201 may determine a first configuration for receiving the number of PDSCH repetitions from the second device 202. For example, the first configuration may assign the first and second TCI states to the number of PDSCH repetitions. In some embodiments, the control information transmitted from the second device 202 to the first device 201 may further include a RV indication field (represented as "$RV_{id}$" in the following), which may indicate a sequence of RVs to be applied to the PDSCH repetitions. For example, the RV field may use 2 bits. In some embodiments, the first device 201 may determine, from the control information, an indication of the sequence of RVs and determine, at least based on the indication, a second configuration for receiving the PDSCH repetitions from the second device 202. For example, the second configuration may indicate a sequence of RVs to be applied to the number of PDSCH repetitions. As such, the first device 201 may receive the PDSCH repetitions based on the first and second configurations.

In some embodiments, in different cases (for example, different values of K, different total repetition numbers, and/or different values of $RV_{id}$), the sequence of RVs to be applied to the PDSCH repetitions may be different. In some embodiments, a configuration table for indicating the sequence of RVs to be applied to the PDSCH repetitions may be configured at both the first device 201 and the second device 202. As such, when the first device 201 receives the control information from the second device 202 and determines the value of $RV_{id}$ from the control information, the first device 201 can determine the sequence of RVs to be applied to the PDSCH repetitions based on the value of $RV_{id}$ and/or other information (such as, the total repetition number, the value of K and so on).

In some embodiments, the second configuration which indicates the sequence of RVs to be applied to the PDSCH repetitions can be determined such that, for adjacent PDSCH repetitions, RVs are able to form a complete set {0, 2, 3, 1} as much as possible. In the following, if a RV is 0, the RV is also represented as "RV-0"; if a RV is 2, the RV is also represented as "RV-2"; if a RV is 3, the RV is also represented as "RV-3"; and if a RV is 1, the RV is also represented as "RV-1". Since RV-0 and RV-3 usually have better self-decoding performance, in some embodiments, the second configuration which indicates the sequence of RVs to be applied to the PDSCH repetitions can be determined such that the sequence of RVs applied to the PDSCH repetitions can achieve good self-decoding performance.

It is assumed that the control information transmitted from the second device 202 to the first device 201 indicates a TCI codepoint, the TCI codepoint is configured with 2 TCI states, and the total number of PDSCH repetitions is 2. In some embodiments, in this case, if the value of $RV_{id}$ indicated in the control information scheduling the PDSCH is 0, RV-0 may be used for the first PDSCH repetition and RV-3 may be used for the second PDSCH repetition. In some embodiments, if the value of $RV_{id}$ indicated in the control information scheduling the PDSCH is 2, RV-2 may be used for the first PDSCH repetition and RV-1 may be used for the second PDSCH repetition. In some embodiments, if the value of $RV_{id}$ indicated in the control information scheduling the PDSCH is 3, RV-3 may be used for the first PDSCH repetition and RV-0 may be used for the second PDSCH repetition. In some embodiments, if the value of $RV_{id}$ indicated in the control information scheduling the PDSCH is 1, RV-1 may be used for the first PDSCH repetition and RV-2 may be used for the second PDSCH repetition. In some embodiments, the size of the RV field in the control information for indicating the $RV_{id}$ may be only 1, and the value of $RV_{id}$ may be either 0 or 1. In some embodiments, the RV field in the control information for indicating the $RV_{id}$ may be not used, and RV-0 may be used for the first PDSCH repetition and RV-3 may be used for the second PDSCH repetition.

FIGS. 5A-5G illustrate example diagrams of different RV sequences applied to the PDSCH repetitions in different cases.

Figure 5A:
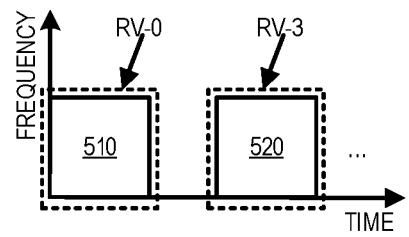
FIGS. 5A-5G illustrate example diagrams for assigning RVs to different PDSCH repetitions in accordance with some embodiments of the present disclosure.
Figure 5B:
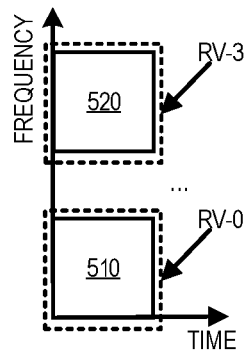

FIG. 5A shows an example in the case of TDM. In FIG. 5A, it is assumed that the total number of PDSCH repetitions scheduled by single DCI is 2. For example, as shown in FIG. 5A, 2 PDSCH transmission occasions 510 and 520 are configured to be scheduled by single DCI. In some embodiments, as shown in FIG. 5A, if the value of $RV_{id}$ indicated in the control information scheduling the PDSCH is 0, RV-0 may be used for the PDSCH repetition 510 and RV-3 may be used for the PDSCH repetition 520. FIG. 5B shows another example in the case of FDM. In FIG. 5B, it is assumed that the total number of PDSCH repetitions scheduled by single DCI is 2. For example, as shown in FIG. 5B, 2 PDSCH transmission occasions 510 and 520 are configured to be scheduled by single DCI. In some embodiments, as shown in FIG. 5B, if the value of $RV_{id}$ indicated in the control information scheduling the PDSCH is 0, RV-0 may be used for the PDSCH repetition 510 and RV-3 may be used for the PDSCH repetition 520.

In some embodiments, in FIGS. 5A and/or 5B, if the value of $RV_{id}$ indicated in the control information scheduling the PDSCH is 2, RV-2 may be used for the PDSCH repetition 510 and RV-1 may be used for the PDSCH repetition 520. If the value of $RV_{id}$ indicated in the control information scheduling the PDSCH is 3, RV-3 may be used for the PDSCH repetition 510 and RV-0 may be used for the PDSCH repetition 520. Alternatively, if the value of $RV_{id}$ indicated in the control information scheduling the PDSCH is 1, RV-1 may be used for the PDSCH repetition 510 and RV-2 may be used for the PDSCH repetition 520. For example, Table 1 shows an example configuration table for indicating the sequence of RVs to be applied to the PDSCH repetitions as below.

TABLE 1

Configuration Table for Indicating RV Sequence

| $RV_{id}$ indicated by the control information scheduling the PDSCH | $RV_{id}$ to be applied to the $n^{th}$ transmission occasion (where n = 0 or 1) | |
|---|---|---|
| | n mode 2 = 0 | n mode 2 = 1 |
| 0 | 0 | 3 |
| 2 | 2 | 1 |
| 3 | 3 | 0 |
| 1 | 1 | 2 |

Figure 5C:
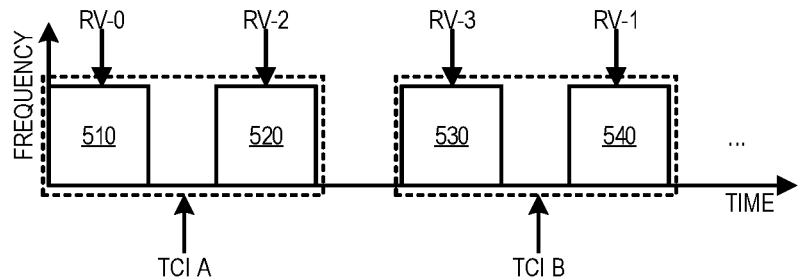

FIG. 5C shows another example of such embodiments. In FIG. 5C, it is assumed that the total number of PDSCH repetitions scheduled by single DCI is 4. For example, as shown in FIG. 5C, 4 PDSCH transmission occasions 510, 520, 530 and 540 are configured to be scheduled by single DCI. In FIG. 5C, it is also assumed that K=2. For example, TCI A and TCI B are to be used for PDSCH transmission/reception. In some embodiments, as shown in FIG. 5C, the first two PDSCH repetitions 510 and 520 may be transmitted/received based on TCI A, while the remaining two PDSCH repetitions 530 and 540 may be transmitted/received based on TCI B.

In some embodiments, if the value of $RV_{id}$ indicated in the control information scheduling the PDSCH is 0, as shown in FIG. 5C, RV-0 may be used for the PDSCH repetition 510, RV-2 may be used for the PDSCH repetition 520, RV-3 may be used for the PDSCH repetition 530 and RV-1 may be used for the PDSCH repetition 540. In some embodiments, if the value of $RV_{id}$ indicated in the control information scheduling the PDSCH is 2, RV-2 may be used for the PDSCH repetition 510, RV-3 may be used for the PDSCH repetition 520, RV-1 may be used for the PDSCH repetition 530 and RV-0 may be used for the PDSCH repetition 540. In some embodiments, if the value of $RV_{id}$ indicated in the control information scheduling the PDSCH is 3, RV-3 may be used for the PDSCH repetition 510, RV-1 may be used for the PDSCH repetition 520, RV-0 may be used for the PDSCH repetition 530 and RV-2 may be used for the PDSCH repetition 540. Alternatively, in some embodiments, if the value of $RV_{id}$ indicated in the control information scheduling the PDSCH is 1, RV-1 may be used for the PDSCH repetition 510, RV-0 may be used for the PDSCH repetition 520, RV-2 may be used for the PDSCH repetition 530 and RV-3 may be used for the PDSCH repetition 540. For example, Table 2 shows an example configuration table for indicating the sequence of RVs to be applied to the PDSCH repetitions as below.

TABLE 2

Configuration Table for Indicating RV Sequence

| $RV_{id}$ indicated by the control information scheduling the PDSCH | $RV_{id}$ to be applied to the $n^{th}$ transmission occasion (where n = 0, 1, 2 or 3) | | | |
|---|---|---|---|---|
| | n mode 4 = 0 | n mode 4 = 1 | n mode 4 = 2 | n mode 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Figure 5D:
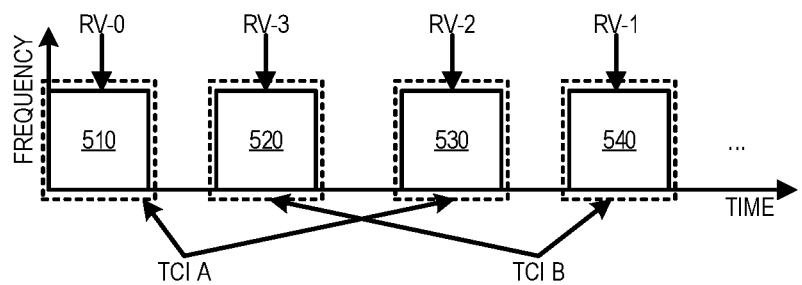

FIG. 5D shows yet another example of such embodiments. In FIG. 5D, it is assumed that the total number of PDSCH repetitions scheduled by single DCI is 4. For example, as shown in FIG. 5D, 4 PDSCH transmission occasions 510, 520, 530 and 540 are configured to be scheduled by single DCI. In FIG. 5D, it is also assumed that K=2. For example, TCI A and TCI B are to be used for PDSCH transmission/reception. In some embodiments, as shown in FIG. 5D, the PDSCH repetitions 510 and 530 may be transmitted/received based on TCI A, while the remaining PDSCH repetitions 520 and 540 may be transmitted/received based on TCI B.

In some embodiments, if the value of $RV_{id}$ indicated in the control information scheduling the PDSCH is 0, as shown in FIG. 5D, RV-0 may be used for the PDSCH repetition 510, RV-3 may be used for the PDSCH repetition 520, RV-2 may be used for the PDSCH repetition 530 and RV-1 may be used for the PDSCH repetition 540. In some embodiments, if the value of $RV_{id}$ indicated in the control information scheduling the PDSCH is 2, RV-2 may be used for the PDSCH repetition 510, RV-1 may be used for the PDSCH repetition 520, RV-0 may be used for the PDSCH repetition 530 and RV-3 may be used for the PDSCH repetition 540. In some embodiments, if the value of $RV_{id}$ indicated in the control information scheduling the PDSCH is 3, RV-3 may be used for the PDSCH repetition 510, RV-0 may be used for the PDSCH repetition 520, RV-1 may be used for the PDSCH repetition 530 and RV-2 may be used for the PDSCH repetition 540. Alternatively, in some embodiments, if the value of $RV_{id}$ indicated in the control information scheduling the PDSCH is 1, RV-1 may be used for the PDSCH repetition 510, RV-2 may be used for the PDSCH repetition 520, RV-0 may be used for the PDSCH repetition 530 and RV-3 may be used for the PDSCH repetition 540. For example, Table 3 shows an example configuration table for indicating the sequence of RVs to be applied to the PDSCH repetitions as below.

Figure 5E:
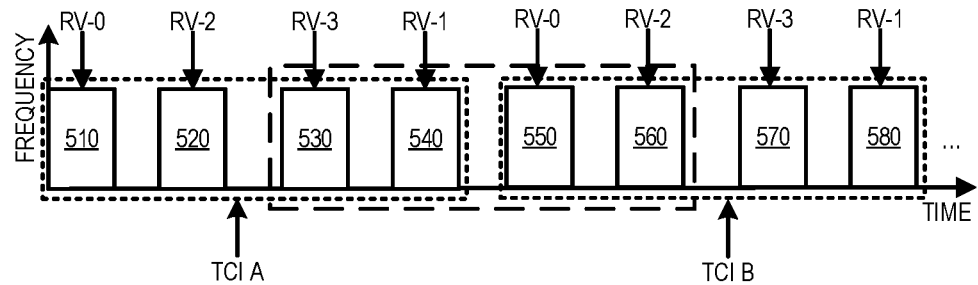

FIG. 5E shows yet another example of such embodiments. In FIG. 5E, it is assumed that the total number of PDSCH repetitions scheduled by single DCI is 8. For example, as shown in FIG. 5E, 8 PDSCH transmission occasions 510, 520, 530, 540, 550, 560, 570 and 580 are configured to be scheduled by single DCI. In FIG. 5E, it is also assumed that K=2. For example, TCI A and TCI B are to be used for PDSCH transmission/reception. In some embodiments, as shown in FIG. 5E, the first four PDSCH repetitions 510-540 may be transmitted/received based on TCI A, while the remaining four PDSCH repetitions 550-580 may be transmitted/received based on TCI B.

In some embodiments, if the value of $RV_{id}$ indicated in the control information scheduling the PDSCH is 0, as shown in FIG. 5E, RV-0 may be used for the PDSCH repetition 510, RV-2 may be used for the PDSCH repetition 520, RV-3 may be used for the PDSCH repetition 530, RV-1 may be used for the PDSCH repetition 540, RV-0 may be used for the PDSCH repetition 550, RV-2 may be used for the PDSCH repetition 560, RV-3 may be used for the PDSCH repetition 570 and RV-1 may be used for the PDSCH repetition 580. In some embodiments, if the value of $RV_{id}$ indicated in the control information scheduling the PDSCH is 2, 3, or 1, the sequence of RVs to be applied to the 8 PDSCH repetitions can be determined similarly. For example, Table 4 shows an example configuration table for indicating the sequence of RVs to be applied to the PDSCH repetitions as below.

TABLE 3

Configuration Table for Indicating RV Sequence

| $RV_{id}$ indicated by the control information scheduling the PDSCH | $RV_{id}$ to be applied to the $n^{th}$ transmission occasion (where n = 0, 1, 2 or 3) | | | |
|---|---|---|---|---|
| | n mode 4 = 0 | n mode 4 = 1 | n mode 4 = 2 | n mode 4 = 3 |
| 0 | 0 | 3 | 2 | 1 |
| 2 | 2 | 1 | 0 | 3 |
| 3 | 3 | 0 | 1 | 2 |
| 1 | 1 | 2 | 0 | 3 |

TABLE 4

Configuration Table for Indicating RV Sequence

| $RV_{id}$ indicated by the control information scheduling the PDSCH | $RV_{id}$ to be applied to the $n^{th}$ transmission occasion (where n = 0, 1, 2, 3, 4, 5, 6 or 7) | | | | | | | |
|---|---|---|---|---|---|---|---|---|
| | n mode 8 = 0 | n mode 8 = 1 | n mode 8 = 2 | n mode 8 = 3 | n mode 8 = 4 | n mode 8 = 5 | n mode 8 = 6 | n mode 8 = 7 |
| 0 | 0 | 2 | 3 | 1 | 0 | 2 | 3 | 1 |
| 2 | 2 | 3 | 1 | 0 | 2 | 3 | 1 | 0 |
| 3 | 3 | 1 | 0 | 2 | 3 | 1 | 0 | 2 |
| 1 | 1 | 0 | 2 | 3 | 1 | 0 | 2 | 3 |

Figure 5F:
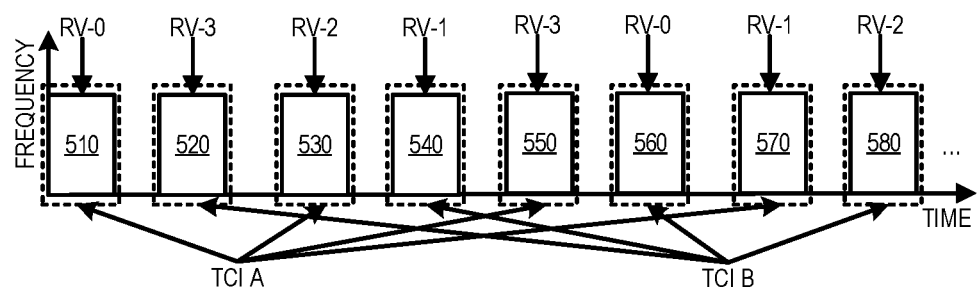

FIG. 5F shows a further example of such embodiments. In FIG. 5F, it is assumed that the total number of PDSCH repetitions scheduled by single DCI is 8. For example, as shown in FIG. 5F, 8 PDSCH transmission occasions 510, 520, 530, 540, 550, 560, 570 and 580 are configured to be scheduled by single DCI. In FIG. 5F, it is also assumed that K=2. For example, TCI A and TCI B are to be used for PDSCH transmission/reception. In some embodiments, as shown in FIG. 5F, the PDSCH repetitions 510, 530, 550 and 570 may be transmitted/received based on TCI A, while the remaining PDSCH repetitions 520, 540, 560 and 580 may be transmitted/received based on TCI B.

In some embodiments, if the value of $RV_{id}$ indicated in the control information scheduling the PDSCH is 0, as shown in FIG. 5F, RV-0 may be used for the PDSCH repetition 510, RV-3 may be used for the PDSCH repetition 520, RV-2 may be used for the PDSCH repetition 530, RV-1 may be used for the PDSCH repetition 540, RV-3 may be used for the PDSCH repetition 550, RV-0 may be used for the PDSCH repetition 560, RV-1 may be used for the PDSCH repetition 570 and RV-2 may be used for the PDSCH repetition 580. In some embodiments, if the value of $RV_{id}$ indicated in the control information scheduling the PDSCH is 2, 3, or 1, the sequence of RVs to be applied to the 8 PDSCH repetitions can be determined similarly. For example, Table 5 shows an example configuration table for indicating the sequence of RVs to be applied to the PDSCH repetitions as below.

Figure 5G:
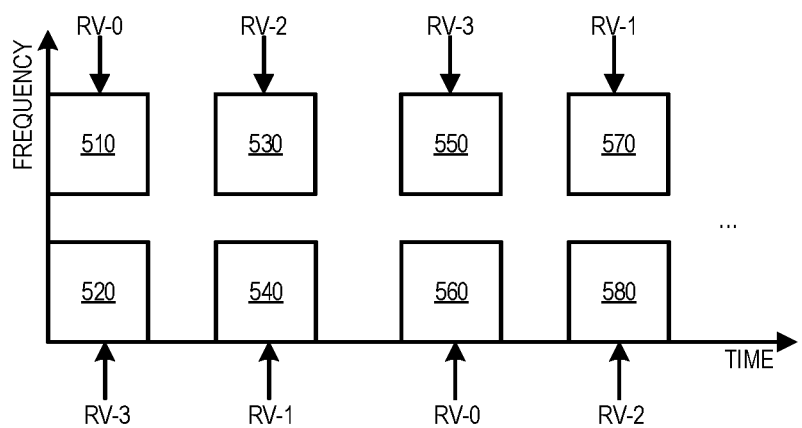

FIG. 5G shows an example in the case of FDM combined with TDM. In FIG. 5G, it is assumed that the total number of PDSCH repetitions scheduled by single DCI is 8. For example, as shown in FIG. 5G, 8 PDSCH transmission occasions 510, 520, 530, 540, 550, 560, 570 and 580 are configured to be scheduled by single DCI. In some embodiments, if the value of $RV_{id}$ indicated in the control information scheduling the PDSCH is 0, as shown in FIG. 5G, RV-0 may be used for the PDSCH repetition 510, RV-3 may be used for the PDSCH repetition 520, RV-2 may be used for the PDSCH repetition 530, RV-1 may be used for the PDSCH repetition 540, RV-3 may be used for the PDSCH repetition 550, RV-0 may be used for the PDSCH repetition 560, RV-1 may be used for the PDSCH repetition 570 and RV-2 may be used for the PDSCH repetition 580. In some embodiments, if the value of $RV_{id}$ indicated in the control information scheduling the PDSCH is 2, 3, or 1, the sequence of RVs to be applied to the 8 PDSCH repetitions can be determined similarly. For example, Table 6 shows an example configuration table for indicating the sequence of RVs to be applied to the PDSCH repetitions as below.

TABLE 5

Configuration Table for Indicating RV Sequence

| $RV_{id}$ indicated by the control information scheduling the PDSCH | $RV_{id}$ to be applied to the $n^{th}$ transmission occasion (where n = 0, 1, 2, 3, 4, 5, 6 or 7) | | | | | | | |
|---|---|---|---|---|---|---|---|---|
| | n mode 8 = 0 | n mode 8 = 1 | n mode 8 = 2 | n mode 8 = 3 | n mode 8 = 4 | n mode 8 = 5 | n mode 8 = 6 | n mode 8 = 7 |
| 0 | 0 | 3 | 2 | 1 | 3 | 0 | 1 | 2 |
| 2 | 2 | 1 | 3 | 0 | 1 | 2 | 0 | 3 |
| 3 | 3 | 0 | 1 | 2 | 0 | 3 | 2 | 1 |
| 1 | 1 | 2 | 0 | 3 | 2 | 1 | 0 | 3 |

TABLE 6

Configuration Table for Indicating RV Sequence

| $RV_{id}$ indicated by the control information scheduling the PDSCH | $RV_{id}$ to be applied to the $n^{th}$ transmission occasion (where n = 0, 1, 2, 3, 4, 5, 6 or 7) | | | | | | | |
|---|---|---|---|---|---|---|---|---|
| | n mode 8 = 0 | n mode 8 = 1 | n mode 8 = 2 | n mode 8 = 3 | n mode 8 = 4 | n mode 8 = 5 | n mode 8 = 6 | n mode 8 = 7 |
| 0 | 0 | 3 | 2 | 1 | 3 | 0 | 1 | 2 |
| 2 | 2 | 1 | 3 | 0 | 1 | 2 | 0 | 3 |
| 3 | 3 | 0 | 1 | 2 | 0 | 3 | 2 | 1 |
| 1 | 1 | 2 | 0 | 3 | 2 | 1 | 0 | 3 |

In some embodiments, if at least the first and second TCI states (such as, TCI A and TCI B) are to be used for PDSCH transmission/reception, the $RV_{id}$ indicated in the control information scheduling the PDSCH may only be applied to the first TCI state (such as, TCI A). In some embodiments, the RV sequence for the second TCI state (such as, TCI B) may be predefined or fixed. For example, the predefined or fixed RV sequence for the second TCI state (such as, TCI B) may be {0, 2, 3, 1}. For example, Table 7 shows an example configuration table for indicating the sequence of RVs to be applied to the PDSCH repetitions as below.

TABLE 7

Configuration Table for Indicating RV Sequence

| $RV_{id}$ indicated by the control information scheduling the PDSCH | $RV_{id}$ to be applied to the $n^{th}$ transmission occasion (where n = 0, 1, 2, 3, 4, 5, 6 or 7) | | | | | | | |
|---|---|---|---|---|---|---|---|---|
| | TCI A | | | | TCI B | | | |
| | n mode 8 = 0 | n mode 8 = 1 | n mode 8 = 2 | n mode 8 = 3 | n mode 8 = 4 | n mode 8 = 5 | n mode 8 = 6 | n mode 8 = 7 |
| 0 | 0 | 2 | 3 | 1 | 0 | 2 | 3 | 1 |
| 2 | 2 | 3 | 1 | 0 | 0 | 2 | 3 | 1 |
| 3 | 3 | 1 | 0 | 2 | 0 | 2 | 3 | 1 |
| 1 | 1 | 0 | 2 | 3 | 0 | 2 | 3 | 1 |

In some embodiments, if the total number of PDSCH repetitions exceeds a threshold X, there may be no need to indicate the $RV_{id}$ in the control information. For example, if the total number of PDSCH repetitions is 4 or 8, the sequence of RVs to be applied to the PDSCH repetitions can be determined based on a complete set 10, 2, 3, 11, and thus the RV field in the control information can be omitted. In some embodiments, in this case, the RV field in the control information can be used for other purposes, such as, indicating the number of TCI states or an order for assigning the TCI states to different PDSCH repetitions.

In some embodiments, if the total number of PDSCH repetitions is 4 or 8, the RV field in the control information for indicating the $RV_{id}$ may use only 1 bit. For example, Table 8 shows an example configuration table for indicating the sequence of RVs to be applied to the PDSCH repetitions as below, where the total number of PDSCH repetitions is 8. Table 9 shows another example configuration table for indicating the sequence of RVs to be applied to the PDSCH repetitions as below, where the total number of PDSCH repetitions is 4.

TABLE 8

Configuration Table for Indicating RV Sequence

| $RV_{id}$ indicated by the control information scheduling the PDSCH | $RV_{id}$ to be applied to the $n^{th}$ transmission occasion (where n = 0, 1, 2, 3, 4, 5, 6 or 7) | | | | | | | |
|---|---|---|---|---|---|---|---|---|
| | n mode 8 = 0 | n mode 8 = 1 | n mode 8 = 2 | n mode 8 = 3 | n mode 8 = 4 | n mode 8 = 5 | n mode 8 = 6 | n mode 8 = 7 |
| 0 | 0 | 3 | 2 | 1 | 3 | 0 | 1 | 2 |
| 2 | 2 | 1 | 3 | 0 | 1 | 2 | 0 | 3 |

TABLE 9

Configuration Table for Indicating RV Sequence

| $RV_{id}$ indicated by the control information scheduling the PDSCH | $RV_{id}$ to be applied to the $n^{th}$ transmission occasion (where n = 0, 1, 2 or 3) | | | |
|---|---|---|---|---|
| | n mode 4 = 0 | n mode 4 = 1 | n mode 4 = 2 | n mode 4 = 3 |
| 0 | 0 | 2 | 3 | 1 |
| 2 | 2 | 3 | 1 | 0 |

In some embodiments, the RV field in combination with other information (such as, DMRS indication table and/or TCI states) can be used to jointly indicate at least one of the following: TCI states, an order for assigning the TCI states to different PDSCH repetitions, a sequence of RVs, or an indication about DMRS. In some embodiments, a size of the RV field in the control information for indicating the $RV_{id}$ may depend on the number of TCI states and/or the total number of PDSCH repetitions. For example, if there is only 1 TCI state, the RV field may use 2 bits. For another example, if there are two or more TCI states, the RV field may use only 1 bit. For another example, if there are three or four TCI states, the TCI states and the the $RV_{id}$ can be jointly indicated. In some embodiments, for a RV configuration table, the $RV_{id}$ to be applied to the nth transmission occasion for the second TCI state can be determined based on a formula: (n mod M+L) mod M, where, for example, L=3 and M represent the total number of PDSCH repetitions.

In some embodiments, if the control information transmitted from the second device 202 to the first device 201 indicates a TCI codepoint and the TCI codepoint is configured with 2 TCI states, the first device 201 may determine a first TCI state (represented as "TCI A" in the following) and a second TCI state (represented as "TCI B" in the following) to be used for PDSCH reception. In some embodiments, if the total number of PDSCH repetitions is N (where N is an integer and N>=2), the RV sequence for the PDSCH repetitions associated with TCI A may be different from the RV sequence for the PDSCH repetitions associated with TCI B. In some embodiments, if the RV sequence for the PDSCH repetitions associated with TCI A is {a, b, c, d}, then the RV sequence for the PDSCH repetitions associated with TCI B is {((a+3) mod 4), ((b+3) mod 4), ((c+3) mod 4), ((d+3) mod 4)}, where a, b, c and d each can be selected from the set {0, 2, 3, 1} and the values of a, b, c and d are different from each other. For example, if the RV sequence for the PDSCH repetitions associated with TCI A is {0, 2, 3, 1} or {0, 2}, then the RV sequence for the PDSCH repetitions associated with TCI B is {3, 1, 0, 2} or {3, 1}.

It is to be understood that, embodiments of the present disclosure as described above with reference to FIGS. 3A-3C, 4A-4B and 5A-5G are also applicable to PUSCH. It can be seen that, embodiments of the present disclosure can assign TCI states and/or RVs to a number of PDSCH or PUSCH repetitions so as to achieve better decoding performance of the PDSCH or PUSCH.

Figure 6:
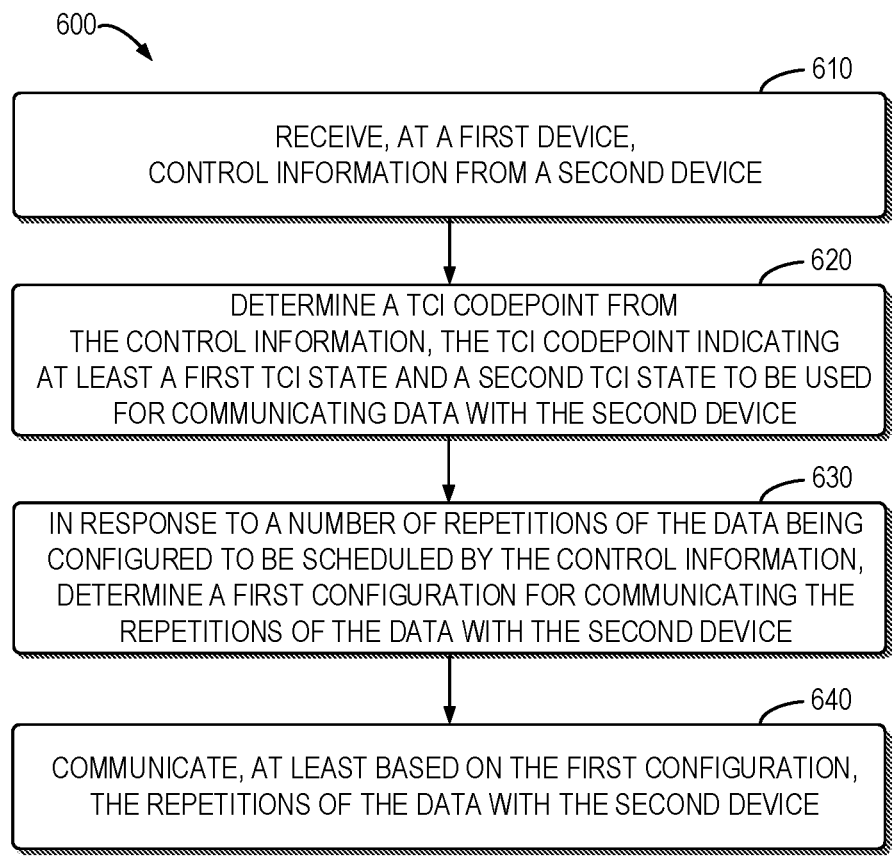
FIG. 6 illustrates an example method in accordance with some embodiments of the present disclosure.

FIG. 6 illustrates an example method 600 in accordance with some embodiments of the present disclosure. In some embodiments, for example, the method 600 may be performed at the first device 201 as shown in FIG. 2. It is to be understood that the method 600 may include additional blocks not shown and/or may omit some blocks as shown, and the scope of the present disclosure is not limited in this regard.

At block 610, the first device 201 receives control information from the second device 202.

At block 620, the first device 201 determines a transmission control indication (TCI) codepoint from the control information. The TCI codepoint indicates at least a first TCI state and a second TCI state to be used for communicating data with the second device over a physical shared channel.

At block 630, in response to a number of repetitions of the data being configured to be scheduled by the control information, the first device 201 determines a first configuration for communicating the repetitions of the data with the second device, the first configuration assigning the first and second TCI states to the repetitions of the data.

At block 640, the first device 201 communicates, at least based on the first configuration, the repetitions of the data with the second device 202 over the physical shared channel.

In some embodiments, the first device 201 determines, from the control information, an indication of redundancy versions for the repetitions of the data. Then, the first device 201 determines, at least based on the indication, a second configuration for communicating the repetitions of the data with the second device 202. The second configuration indicates a redundancy version to be used by one of the repetitions of the data.

In some embodiments, the first device 201 communicates, based on the first and second configurations, the repetitions of the data with the second device over the physical shared channel.

In some embodiments, the physical shared channel is a Physical Uplink Shared Channel (PUSCH), and the first device 201 communicates the repetitions of the data with the second device 202 by transmitting, at least based on the first configuration, the repetitions of the data to the second device 202 over the PUSCH.

In some embodiments, the physical shared channel is a Physical Downlink Shared Channel (PDSCH), and the first device 201 communicates the repetitions of the data with the second device 202 by receiving, at least based on the first configuration, the repetitions of the data from the second device over the PDSCH.

In some embodiments, the number of repetitions is one of the following: 1, 2, 4 or 8.

In some embodiments, the redundancy version to be used by one of the repetitions of the data is one of the following: 0, 2, 3 or 1.

In some embodiments, the first device 201 is a terminal device (such as, the terminal device 130 in FIG. 1) and the second device 202 is a network device (such as, the network device 110 in FIG. 1) serving the terminal device or a TRP (such as, the network TRP 120 in FIG. 1) coupled to the network device.

Figure 7:
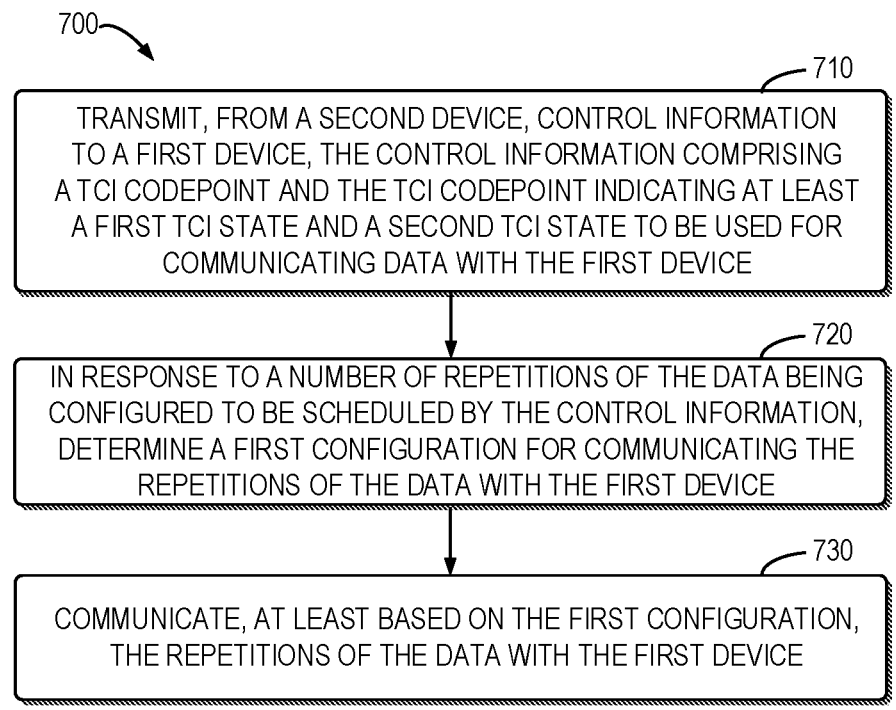
FIG. 7 illustrates an example method in accordance with some embodiments of the present disclosure.

FIG. 7 illustrates an example method 700 in accordance with some embodiments of the present disclosure. In some embodiments, for example, the method 700 may be performed at the second device 202 as shown in FIG. 2. It is to be understood that the method 700 may include additional blocks not shown and/or may omit some blocks as shown, and the scope of the present disclosure is not limited in this regard.

At block 710, the second device 202 transmits control information to the first device 201. The control information comprises a transmission control indication (TCI) codepoint and the TCI codepoint indicates at least a first TCI state and a second TCI state to be used for communicating data with the first device over a physical shared channel.

At block 720, in response to a number of repetitions of the data being configured to be scheduled by the control information, the second device 202 determines a first configuration for communicating the repetitions of the data with the first device 201. The first configuration assigns the first and second TCI states to the repetitions of the data.

At block 730, the second device 202 communicates, at least based on the first configuration, the repetitions of the data with the first device 201 over the physical shared channel.

In some embodiments, the control information further comprises an indication of redundancy versions for the repetitions of the data. In some embodiments, the second device 202 determines, at least based on the indication, a second configuration for communicating the repetitions of the data with the first device 201. The second configuration indicates a redundancy version to be used by one of the repetitions of the data.

In some embodiments, the second device 202 communicates, based on the first and second configurations, the repetitions of the data with the first device 201 over the physical shared channel.

In some embodiments, the physical shared channel is a Physical Uplink Shared Channel (PUSCH), and the second device 202 communicates the repetitions of the data with the first device 201 by receiving, at least based on the first configuration, the repetitions of the data from the first device 201 over the PUSCH.

In some embodiments, the physical shared channel is a Physical Downlink Shared Channel (PDSCH), and the second device 202 communicates the repetitions of the data with the first device 201 by transmitting, at least based on the first configuration, the repetitions of the data to the first device over the PDSCH.

In some embodiments, the number of repetitions is one of the following: 1, 2, 4 or 8.

In some embodiments, the redundancy version to be used by one of the repetitions of the data is one of the following: 0, 2, 3 or 1.

In some embodiments, the first device 201 is a terminal device (such as, the terminal device 130 in FIG. 1) and the second device 202 is a network device (such as, the network device 110 in FIG. 1) serving the terminal device or a TRP (such as, the network TRP 120 in FIG. 1) coupled to the network device.

FIG. 8 is a simplified block diagram of a device 800 that is suitable for implementing embodiments of the present disclosure. The device 800 can be considered as a further example implementation of the network device 110, the TRP 120 or the terminal device 130 as shown in FIG. 1. Accordingly, the device 800 can be implemented at or as at least a part of the network device 110, the TRP 120 or the terminal device 130.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 830 is assumed to include program instructions that, when executed by the associated processor 810, enable the device 800 to operate in accordance with the embodiments of the present disclosure, as discussed herein with reference to FIGS. 1 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 6-7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, performed by a terminal device, comprising:
receiving control information comprising a redundancy version (RV) indication field associated with a plurality of physical downlink shared channel (PDSCH) transmission occasions for repetition, the plurality of PDSCH transmission occasions comprising at least one PDSCH transmission occasion associated with a first transmission control indication (TCI) state and at least one PDSCH transmission occasion associated with a second TCI state, the RV indication field corresponding to a first RV sequence and a second RV sequence, and the first RV sequence being applied to the at least one PDSCH transmission occasion associated with the first TCI state, the second RV sequence being applied to the at least one PDSCH transmission occasion associated with the second TCI state; and
receiving a PDSCH associated with the plurality of PDSCH transmission occasions based on the control information;
wherein,
in a case where the number of the plurality of PDSCH transmission occasions is 2,
the first RV sequence is {0}, the second RV sequence is {3}, in a case where a value of the RV indication field is 0, and
the first RV sequence is {2}, the second RV sequence is {1}, in a case where a value of the RV indication field is 2;
in a case where the number of the plurality of PDSCH transmission occasions is 4,
the first RV sequence is {0, 2}, the second RV sequence is {3, 1}, in a case where a value of the RV indication field is 0;

in a case where the number of the plurality of PDSCH transmission occasions is 8, the first RV sequence is {a, b, c, d}, the second RV sequence is {((a+3) mod 4), ((b+3) mod 4), ((c+3) mod 4), ((d+3) mod 4)}, wherein each of a, b, c and d is from a set of {0, 2, 3, 1}, and values of a, b, c and d are different with each other.

2. The method of claim 1, wherein in a case where the number of the plurality of PDSCH transmission occasions is 2, the at least one PDSCH transmission occasion associated with the first TCI state comprises a first PDSCH transmission occasion of the plurality of PDSCH occasions, and the at least one PDSCH transmission occasion associated with the second TCI state comprises a second PDSCH transmission occasion of the plurality of PDSCH occasions;

in a case where the number of the plurality of PDSCH transmission occasions is 4, the at least one PDSCH transmission occasion associated with the first TCI state comprises first and second PDSCH transmission occasions of the plurality of PDSCH transmission occasions, and the at least one PDSCH transmission occasion associated with the second TCI state comprises third and fourth PDSCH transmission occasions of the plurality of PDSCH transmission occasions; or the at least one PDSCH transmission occasion associated with the first TCI state comprises first and third PDSCH transmission occasions of the plurality of PDSCH transmission occasions, and the at least one PDSCH transmission occasion associated with the second TCI state comprises second and fourth PDSCH transmission occasions of the plurality of PDSCH transmission occasions.

3. A method, performed by a network device, comprising:

transmitting control information comprising a redundancy version (RV) indication field associated with a plurality of physical downlink shared channel (PDSCH) transmission occasions for repetition, the plurality of PDSCH transmission occasions comprising at least one PDSCH transmission occasion associated with a first transmission control indication (TCI) state and at least one PDSCH transmission occasion associated with a second TCI state, the RV indication field corresponding to a first RV sequence and a second RV sequence, and the first RV sequence being applied to the at least one PDSCH transmission occasion associated with the first TCI state, the second RV sequence being applied to the at least one PDSCH transmission occasion associated with the second TCI state; and transmitting a PDSCH associated with the plurality of PDSCH transmission occasions based on the control information;

wherein, in a case where the number of the plurality of PDSCH transmission occasions is 2, the first RV sequence is {0}, the second RV sequence is {3}, in a case where a value of the RV indication field is 0, and the first RV sequence is {2}, the second RV sequence is {1}, in a case where a value of the RV indication field is 2;

in a case where the number of the plurality of PDSCH transmission occasions is 4, the first RV sequence is {0, 2}, the second RV sequence is {3, 1}, in a case where a value of the RV indication field is 0;

in a case where the number of the plurality of PDSCH transmission occasions is 8, the first RV sequence is {a, b, c, d}, the second RV sequence is {((a+3) mod 4), ((b+3) mod 4), ((c+3) mod 4), ((d+3) mod 4)}, wherein each of a, b, c and d is from a set of {0, 2, 3, 1}, and values of a, b, c and d are different with each other.

4. The method of claim 3, wherein in a case where the number of the plurality of PDSCH transmission occasions is 2, the at least one PDSCH transmission occasion associated with the first TCI state comprises a first PDSCH transmission occasion of the plurality of PDSCH occasions, and the at least one PDSCH transmission occasion associated with the second TCI state comprises a second PDSCH transmission occasion of the plurality of PDSCH occasions;

in a case where the number of the plurality of PDSCH transmission occasions is 4, the at least one PDSCH transmission occasion associated with the first TCI state comprises first and second PDSCH transmission occasions of the plurality of PDSCH transmission occasions, and the at least one PDSCH transmission occasion associated with the second TCI state comprises third and fourth PDSCH transmission occasions of the plurality of PDSCH transmission occasions; or the at least one PDSCH transmission occasion associated with the first TCI state comprises first and third PDSCH transmission occasions of the plurality of PDSCH transmission occasions, and the at least one PDSCH transmission occasion associated with the second TCI state comprises second and fourth PDSCH transmission occasions of the plurality of PDSCH transmission occasions.

5. A terminal device, comprising a processor configured to:

receive control information comprising a redundancy version (RV) indication field associated with a plurality of physical downlink shared channel (PDSCH) transmission occasions for repetition, the plurality of PDSCH transmission occasions comprising at least one PDSCH transmission occasion associated with a first transmission control indication (TCI) state and at least one PDSCH transmission occasion associated with a second TCI state, the RV indication field corresponding to a first RV sequence and a second RV sequence, and the first RV sequence being applied to the at least one PDSCH transmission occasion associated with the first TCI state, the second RV sequence being applied to the at least one PDSCH transmission occasion associated with the second TCI state; and receive a PDSCH associated with the plurality of PDSCH transmission occasions based on the control information;

wherein, in a case where the number of the plurality of PDSCH transmission occasions is 2, the first RV sequence is {0}, the second RV sequence is {3}, in a case where a value of the RV indication field is 0, and the first RV sequence is {2}, the second RV sequence is {1}, in a case where a value of the RV indication field is 2;

in a case where the number of the plurality of PDSCH transmission occasions is 4, the first RV sequence is {0, 2}, the second RV sequence is {3, 1}, in a case where a value of the RV indication field is 0;

in a case where the number of the plurality of PDSCH transmission occasions is 8, the first RV sequence is {a, b, c, d}, the second RV sequence is {((a+3) mod 4), ((b+3) mod 4), ((c+3) mod 4), ((d+3) mod 4)}, wherein each of a, b, c and d is from a set of {0, 2, 3, 1}, and values of a, b, c and d are different with each other.

6. The terminal device of claim 5, wherein in a case where the number of the plurality of PDSCH transmission occasions is 2, the at least one PDSCH transmission occasion associated with the first TCI state comprises a first PDSCH transmission occasion of the plurality of PDSCH occasions, and the at least one PDSCH transmission occasion associated with the second TCI state comprises a second PDSCH transmission occasion of the plurality of PDSCH occasions;

in a case where the number of the plurality of PDSCH transmission occasions is 4, the at least one PDSCH transmission occasion associated with the first TCI state comprises first and second PDSCH transmission occasions of the plurality of PDSCH transmission occasions, and the at least one PDSCH transmission occasion associated with the second TCI state comprises third and fourth PDSCH transmission occasions of the plurality of PDSCH transmission occasions; or the at least one PDSCH transmission occasion associated with the first TCI state comprises first and third PDSCH transmission occasions of the plurality of PDSCH transmission occasions, and the at least one PDSCH transmission occasion associated with the second TCI state comprises second and fourth PDSCH transmission occasions of the plurality of PDSCH transmission occasions.

7. A network device, comprising a processor configured to:

transmit control information comprising a redundancy version (RV) indication field associated with a plurality of physical downlink shared channel (PDSCH) transmission occasions for repetition, the plurality of PDSCH transmission occasions comprising at least one PDSCH transmission occasion associated with a first transmission control indication (TCI) state and at least one PDSCH transmission occasion associated with a second TCI state, the RV indication field corresponding to a first RV sequence and a second RV sequence, and the first RV sequence being applied to the at least one PDSCH transmission occasion associated with the first TCI state, the second RV sequence being applied to the at least one PDSCH transmission occasion associated with the second TCI state; and transmit a PDSCH associated with the plurality of PDSCH transmission occasions based on the control information;

wherein, in a case where the number of the plurality of PDSCH transmission occasions is 2, the first RV sequence is {0}, the second RV sequence is {3}, in a case where a value of the RV indication field is 0, and the first RV sequence is {2}, the second RV sequence is {1}, in a case where a value of the RV indication field is 2;

in a case where the number of the plurality of PDSCH transmission occasions is 4, the first RV sequence is {0, 2}, the second RV sequence is {3, 1}, in a case where a value of the RV indication field is 0;

in a case where the number of the plurality of PDSCH transmission occasions is 8, the first RV sequence is {a, b, c, d}, the second RV sequence is {((a+3) mod 4), ((b+3) mod 4), ((c+3) mod 4), ((d+3) mod 4)}, wherein each of a, b, c and d is from a set of {0, 2, 3, 1}, and values of a, b, c and d are different with each other.

8. The method of claim 7, wherein in a case where the number of the plurality of PDSCH transmission occasions is 2, the at least one PDSCH transmission occasion associated with the first TCI state comprises a first PDSCH transmission occasion of the plurality of PDSCH occasions, and the at least one PDSCH transmission occasion associated with the second TCI state comprises a second PDSCH transmission occasion of the plurality of PDSCH occasions;

in a case where the number of the plurality of PDSCH transmission occasions is 4, the at least one PDSCH transmission occasion associated with the first TCI state comprises first and second PDSCH transmission occasions of the plurality of PDSCH transmission occasions, and the at least one PDSCH transmission occasion associated with the second TCI state comprises third and fourth PDSCH transmission occasions of the plurality of PDSCH transmission occasions; or the at least one PDSCH transmission occasion associated with the first TCI state comprises first and third PDSCH transmission occasions of the plurality of PDSCH transmission occasions, and the at least one PDSCH transmission occasion associated with the second TCI state comprises second and fourth PDSCH transmission occasions of the plurality of PDSCH transmission occasions.

* * * * *